United States Patent
Halder

(10) Patent No.: US 11,567,197 B2
(45) Date of Patent: Jan. 31, 2023

(54) AUTOMATED OBJECT DETECTION IN A DUSTY ENVIRONMENT

(71) Applicant: SafeAI, Inc., Milpitas, CA (US)

(72) Inventor: Bibhrajit Halder, Sunnyvale, CA (US)

(73) Assignee: SafeAI, Inc., Milpitas, CA (US)

( * ) Notice: Subject to any disclaimer, the term of this patent is extended or adjusted under 35 U.S.C. 154(b) by 287 days.

(21) Appl. No.: 16/796,556

(22) Filed: Feb. 20, 2020

(65) Prior Publication Data
US 2021/0263152 A1  Aug. 26, 2021

(51) Int. Cl.
*G01S 17/04* (2020.01)
*G01S 17/931* (2020.01)
*G05D 1/02* (2020.01)
*G05D 1/00* (2006.01)
*G01S 7/48* (2006.01)

(52) U.S. Cl.
CPC ............ *G01S 17/04* (2020.01); *G01S 7/4802* (2013.01); *G01S 17/931* (2020.01); *G05D 1/0088* (2013.01); *G05D 1/0231* (2013.01)

(58) Field of Classification Search
CPC ...... G01S 17/04; G01S 7/4802; G01S 17/931; G01S 17/86; G05D 1/0088; G05D 1/0231
See application file for complete search history.

(56) References Cited

U.S. PATENT DOCUMENTS

| 2013/0058527 A1* | 3/2013 | Peynot ................... G01S 17/86 382/103 |
| 2017/0064278 A1* | 3/2017 | Posselius ............. H04N 13/243 |
| 2019/0056504 A1* | 2/2019 | Hartman ................ G01S 17/89 |

* cited by examiner

*Primary Examiner* — Marthe Y Marc-Coleman
(74) *Attorney, Agent, or Firm* — Kilpatrick Townsend & Stockton LLP

(57) ABSTRACT

Systems and methods for object detection in a dusty environment can enhance the ability of autonomous machines to distinguish dust clouds from solid obstacles and proceed appropriately. A library of dust classifiers can be provided, where each dust classifier is separately trained to distinguish airborne dust from objects in the environment. Different dust classifiers can correspond to different categories of dusty environments. Based on current conditions, control logic in an autonomous machine can categorize its environment and select a corresponding dust classifier. The dust classifier output can be used to alter a behavior of the autonomous machine, including a behavior of the control logic. For instance, the control logic can apply a consistency check to the output of the dust classifier and an output of an AI-based object classifier to detect instances where the object classifier misidentifies dust as an object.

22 Claims, 8 Drawing Sheets

| DUST FILTER OUTPUT | OBJECT CLASSIFIER OUTPUT | CONSISTENCY CHECK RESULT |
|---|---|---|
| Dust | No object (background only) | Dust, no object |
| Dust | Stationary object and low confidence | Dust, no object |
| Dust | (other) | Object classifier output |
| Not-dust | (any) | Object classifier output |
| Ambiguous | Stationary object and low confidence | Fail-safe mode |
| Ambiguous | (other) | Object classifier output |

AUTOMATED OBJECT DETECTION IN A DUSTY ENVIRONMENT

TECHNICAL FIELD

The present disclosure relates generally to the operation of autonomous machinery to perform various tasks at various industrial work sites and more particularly to systems and methods for automated detection of objects in an environment where dust may be present.

BACKGROUND

Autonomous machinery can be used in construction, mining, and other industrial operations to reduce the need for human labor and the attendant risks of injury or death. Autonomous machinery is typically outfitted with a variety of environmental sensors (e.g., cameras, LIDAR, etc.) to collect data about the surroundings and control logic to interpret the sensor data (e.g., detecting nearby objects) and regulate action of the machinery accordingly, allowing the machinery to perform a desired operation while avoiding collisions with other objects. When the control logic is unable to interpret the sensor data with high confidence, the machinery may stop and wait for input from a human supervisor.

Industrial sites, such as mines and construction areas, can be dusty environments. Dust particles or dust clouds in the air can register on environmental sensors and can be incorrectly identified by the control logic. For example, a dust cloud may be mistakenly identified as a solid obstacle. resulting in frequent stoppages of autonomous machinery. This can reduce productivity of the autonomous machinery as the autonomous machine may stop and wait for human intervention or reroute itself when it could have proceeded safely through the dust cloud.

SUMMARY

Disclosed herein are examples, or embodiments, of systems and methods for object detection in a dusty environment that can enhance the ability of autonomous machines (including autonomous vehicles) to distinguish dust clouds from solid obstacles and proceed appropriately. In some embodiments, a library of dust classifiers can be provided, where each dust classifier is separately trained to distinguish airborne dust (e.g., a dust cloud or generally dusty air) from objects ("not-dust") in the environment. Various machine-learning models can be used to define and train a dust classifier, including state vector machine (SVM), clustering methods, logistic regression, K-nearest neighbor, and so on. Different dust classifiers can correspond to different categories of dusty environments, such as mines vs. construction sites, or specific types of mines (e.g., gold mine, copper mine, etc.), or sites in specific geographic locations (e.g., gold mine in Arizona vs. gold mine in western Australia), or different environmental conditions related to motion or action of the autonomous machine (e.g., autonomous vehicle driving forward vs. driving in reverse). Based on current conditions, control logic in an autonomous machine can categorize its environment and select a corresponding dust classifier. In some embodiments, the dust classifier output can be used to alter a behavior of the autonomous machine, including a behavior of the control logic. For instance, the control logic can apply a consistency check to the output of the dust classifier and an output of an AI-based object classifier to detect instances where the object classifier misidentifies dust as an object.

Some embodiments relate to computer-implemented methods for an autonomous machine. In some embodiments, an autonomous vehicle management system can receive sensor data from one or more environmental sensors, determine a current environmental category for the autonomous machine, and select a dust classifier from a library of dust classifiers based on the current environmental category. The selected dust classifier can be applied to the sensor data to determine whether dust is detected. Separately, an object classifier can be applied to the sensor data to identify an object in an environment of the autonomous machine. A consistency check can be performed on an output of the selected dust classifier and an output of the object classifier, and a final object identification can be based on a result of the consistency check and the output of the object classifier. In some embodiments, program code that causes a processor to perform such methods can be stored on a computer-readable storage medium.

Some embodiments relate to systems for object identification for an autonomous machine (e.g., an autonomous vehicle). In some embodiments, the system includes a storage subsystem; a set of sensors (e.g., camera, LIDAR system, and/or other sensors) to collect sensor data from an environment around the autonomous machine; and a processor coupled to the set of sensors and the storage subsystem. The storage subsystem can store a library of dust classifiers, each of which has been trained to distinguish between dust and not-dust using sensor data collected in a different one of a plurality of environmental categories (e.g., as described above). The processor can be configured to: receive sensor data from the sensors; determine a current environmental category for the autonomous machine; select a dust classifier from the library of dust classifiers based on the current environmental category; apply the selected dust classifier to the sensor data to determine whether a dusty condition is present; apply an object classifier to the sensor data to identify an object in an environment of the autonomous machine; perform a consistency check on an output of the selected dust classifier and an output of the object classifier; and make a final object identification based on a result of the consistency check and the output of the object classifier.

In some embodiments, the dust classifier output states can indicate dust, not-dust or ambiguous. Where this is the case, making the final object identification can include identifying that only dust is present in the event that the dust classifier output is in the dust state and the object classifier output is in a low-certainty state, while in all other cases the object classifier output is used as the final object identification.

In some embodiments, the current environmental category can be determined based on user input indicating a setting in which the autonomous vehicle is operating and/or information about current activity of the autonomous machine (e.g., whether an autonomous vehicle is moving forward or moving in reverse).

In various embodiments, the final object identification can be used to determine an action of the autonomous machine, e.g., a motion path or speed of an autonomous vehicle.

The following detailed description, together with the accompanying drawings, will provide a better understanding of the nature and advantages of the claimed invention.

DETAILED DESCRIPTION

The following description of embodiments of the invention is presented for the purpose of illustration and description. It is not intended to be exhaustive or to limit the invention to the precise form described, and persons skilled in the art will appreciate that many modifications and variations are possible. The embodiments have been chosen and described in order to best explain the principles of the invention and its practical applications to thereby enable others skilled in the art to best utilize the invention in various embodiments and with various modifications as are suited to the particular use contemplated.

The present disclosure describes several embodiments in the context of an autonomous vehicle. The use of the term "vehicle" and description with respect to a vehicle is not intended to be limiting or restrictive. Embodiments described herein can be used with and applied to any autonomous equipment, including autonomous vehicles and other types of autonomous machines that are configured to perform one or more tasks or operations in an automated manner, substantially free of human intervention.

Figure 1A:
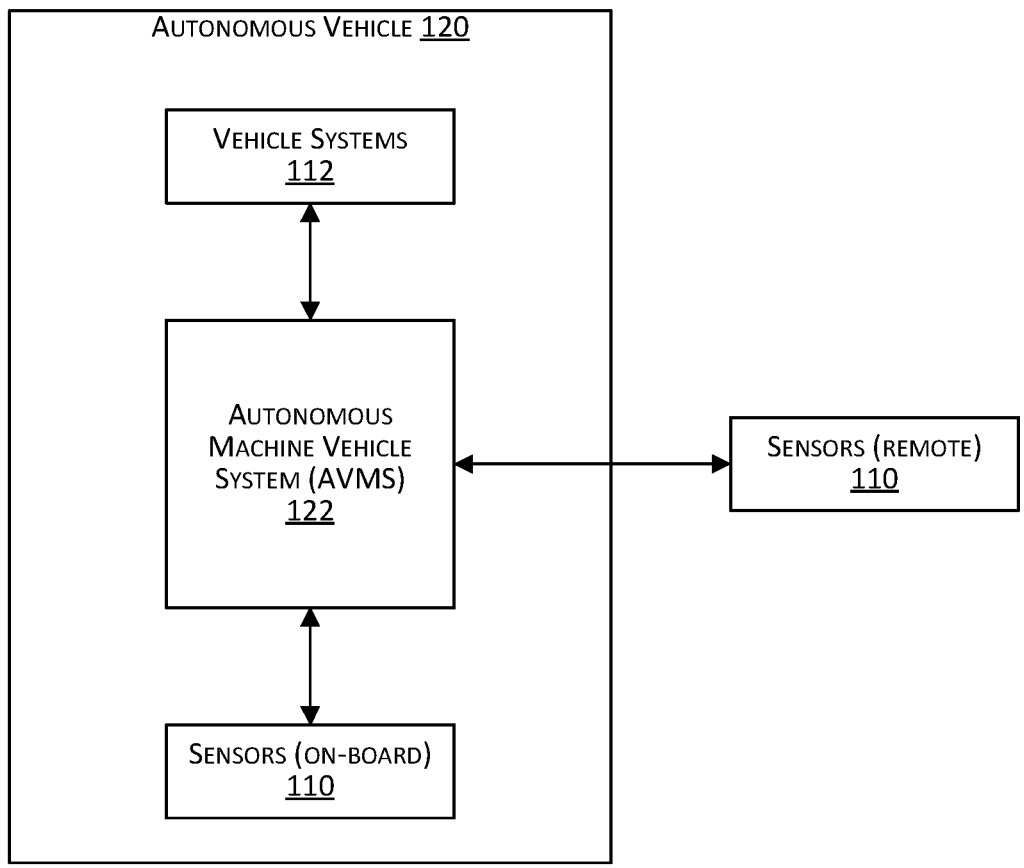
FIG. 1A is a high level simplified block diagram of an autonomous vehicle incorporating a controller system (also referred to herein as autonomous vehicle management system. or AVMS) according to some embodiments.

FIG. 1A is a high level simplified block diagram of an autonomous vehicle 120 incorporating a controller system (referred to herein as autonomous vehicle management system (AVMS) 122) according to certain embodiments. For purposes of this disclosure, an autonomous vehicle, such as autonomous vehicle 120, is a vehicle that is capable of performing one or more operations autonomously and substantially free of any human user or manual input. For example, in certain embodiments, the autonomous operation may be the ability of the vehicle 120 to autonomously sense its environment and navigate or drive along a path autonomously and substantially free of any human user or manual input. Examples of other autonomous operations include, without limitation, scooping and dumping operations, moving materials or objects (e.g., moving dirt or sand from one area to another), lifting materials, driving, rolling, spreading dirt, excavating, transporting materials or objects from one point to another point, and the like.

Autonomous vehicle 120 can be of various different types. For example, autonomous vehicle 120 can be a car or mobile machine that can be used to transport people and/or cargo. Autonomous vehicle 120 can be a specialized vehicle for performing specialized operations such as road or path compacting, rolling, digging, lifting, etc. Examples of autonomous vehicle 120 include without restriction wagons, bicycles, motor vehicles (e.g., motorcycles, cars, trucks, buses), railed vehicles (e.g., trains, trams), watercraft (e.g., ships, boats), aircraft, spacecraft, and/or heavy equipment vehicles (e.g. dump trucks, tractors, bulldozers, excavators, forklifts, etc.). Since the environment of autonomous vehicle 120 can include other vehicles, including other autonomous vehicles, for purposes of clarity, in order to differentiate autonomous vehicle 120 from other vehicles in its environment, autonomous vehicle 120 is also sometimes referred to as the ego vehicle.

Various features are described below using an autonomous vehicle as an example. However, this is not intended to be limiting. The teachings described herein can be applied to any machine that is capable of performing one or more autonomous operations. For example, the teachings can be used by a loader, a compactor, a crane, and the like. The machines may be used in various industries such manufacturing, mining, construction, medical applications, packaging, assembly, surveying, mapping, logistics, etc.

As depicted in FIG. 1A, in addition to autonomous vehicle management system 122, autonomous vehicle 120 may include or be coupled to sensors 110 and vehicle systems 112. Autonomous vehicle management system 122 may be communicatively coupled with sensors 110 and vehicle systems 112 via wired or wireless links. One or more different communication protocols may be used for facilitating communications between autonomous vehicle management system 122 and sensors 110 and between autonomous vehicle management system 122 and vehicle systems 112.

Vehicle systems 112 can include various electro-mechanical systems, components, linkages, etc. that enable autonomous vehicle 120 to perform its intended functions such as traveling or navigating along a particular path or course. Vehicle systems 112 may include for example, a steering system, a throttle system, a braking system, a propulsion system, etc. for driving the autonomous vehicle; electrical systems; auxiliary systems (e.g., systems for outputting information to a driver or passenger of autonomous vehicle 120); and the like. Vehicle systems 112 can be used to set the path and speed of autonomous vehicle 120. In an autonomous vehicle that is configured to perform a specialized operation (e.g., a dump truck that is specialized to perform lift and dump operations, a tractor, etc.), the vehicle systems 112 may also include systems that are configured to perform such specialized operations.

Figure 3:
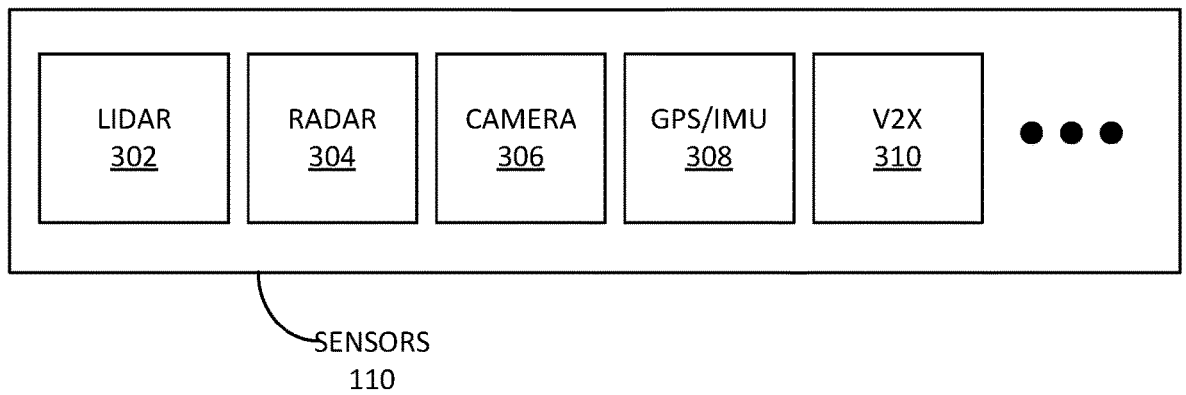
FIG. 3 illustrates an example set of sensors of an autonomous vehicle.

Sensors 110 may be located on or in autonomous vehicle 120 ("onboard sensors") or may be located remotely ("remote sensors") from autonomous vehicle 120. Autonomous vehicle management system 122 may be communicatively coupled with remote sensors via wireless links using a wireless communication protocol. Sensors 110 can obtain environmental information for autonomous vehicle 120. This sensor data can then be fed to autonomous vehicle management system 122. FIG. 3 illustrates an example set of sensors 110 of an autonomous vehicle, including, without limitation, LIDAR (Light Detection and Ranging) sensors 302, radar 304, cameras 306 (different kinds of cameras with different sensing capabilities may be used), Global Positioning System (GPS) and Inertial Measurement Unit (IMU)

sensors 308, Vehicle-to-everything (V2X) sensors 310, audio sensors, and the like. Sensors 110 can obtain (e.g., sense, capture) environmental information for autonomous vehicle 120 and communicate the sensed or captured sensor data to autonomous vehicle management system 122 for processing. Other sensors may include proximity sensors, SONAR sensors, and other sensors.

Examples of radar sensors 304 (e.g., long range radar, short range radar, imaging radar etc.) may include sensors that are used to detect objects in the environment of autonomous vehicle 120 and to determine the velocities of the detected objects. Examples of LIDAR sensors 302 include sensors that use surveying techniques that measure distances to a target by using light in the form of a pulsed laser light. This is done by illuminating the target to be measured with pulsed laser light and measuring the reflected pulses using the sensor. Examples of V2X sensors include sensors that use V2X communication technology to communicate with moving (or stationary) parts of a traffic system. For example, autonomous vehicle 120 may use a V2X sensor for passing and/or receiving information to or from another entity around or near the autonomous vehicle. A V2X communication sensor/system may incorporate other more specific types of communication infrastructures such as V2I (Vehicle-to-Infrastructure), V2V (Vehicle-to-vehicle), V2P (Vehicle-to-Pedestrian), V2D (Vehicle-to-device), V2G (Vehicle-to-grid), and the like. An IMU sensor may be an electronic device that measures and reports a body's specific force, angular rate, and sometimes the magnetic field surrounding the body, using a combination of accelerometers, gyroscopes, magnetometers, etc. GPS sensors use a space-based satellite navigation system to determine geolocation and time information.

In certain embodiments, data obtained from different types of sensors and/or from multiple instances of the same type of sensor may be combined or fused to form a three-dimensional (3D) representation of a scene around the autonomous vehicle, including objects therein, as well as information about the current state of various objects (stationary, in motion, current speed and direction of motion). Various types of sensor combinations may be employed for the purpose of obtaining data for generating the 3D representation. Combining different sensor types has certain advantages. For example, cameras are capable of generating highly detailed images of the environment and/or objects within the environment, whereas LIDAR and radar provide better depth perception. LIDAR is generally more accurate than radar when detecting stationary objects, whereas radar is more accurate at detecting moving objects. As described below, the ability to detect and identify objects may be affected by environmental dust, and in various embodiments, a dust filter can be applied to improve the reliability of object detection and identification.

Autonomous vehicle management system 122 (also referred to as a controller system) is configured to process data describing the state of autonomous vehicle 120 and the state of the autonomous vehicle's environment and, based upon the processing, to control one or more autonomous functions or operations of autonomous vehicle 120. For example, autonomous vehicle management system 122 may issue instructions/commands to vehicle systems 112 to programmatically and autonomously control various aspects of the autonomous vehicle's motion such as the propulsion, braking, steering or navigation, and auxiliary (e.g., turning lights on) functionality of autonomous vehicle 120. Autonomous vehicle management system 122 implements the control and planning algorithms that enable autonomous vehicle 120 to perform one or more operations autonomously.

Autonomous vehicle management system 122 may be implemented using software only, hardware only, or combinations thereof. The software may be stored on a non-transitory computer readable storage medium (e.g., on a memory device) and may be executed by one or more processors (e.g., by computer systems) to perform its functions. In the embodiment depicted in FIG. 1A, autonomous vehicle management system 122 is shown as being in or on autonomous vehicle 120. This is however not intended to be limiting. In alternative embodiments, autonomous vehicle management system 122 can also be remote from autonomous vehicle 120.

Autonomous vehicle management system 122 receives sensor data from sensors 110 on a periodic or on-demand basis. Autonomous vehicle management system 122 uses the sensor data received from sensors 110 to perceive the autonomous vehicle's surroundings and environment. Autonomous vehicle management system 122 uses the sensor data received from sensors 110 to generate and keep updated a digital model that encapsulates information about the state of autonomous vehicle 120 and of the space and environment surrounding autonomous vehicle 120. This digital model may be referred to as an internal map, which encapsulates the current state of autonomous vehicle 120 and its environment. The internal map along with other information is then used by autonomous vehicle management system 122 to make decisions regarding actions (e.g., navigation, braking, acceleration, scooping, dumping, etc.) to be performed by autonomous vehicle 120. Autonomous vehicle management system 122 may send instructions or commands to vehicle systems 112 to cause the actions be performed by components of vehicles systems 112.

Figure 1B:
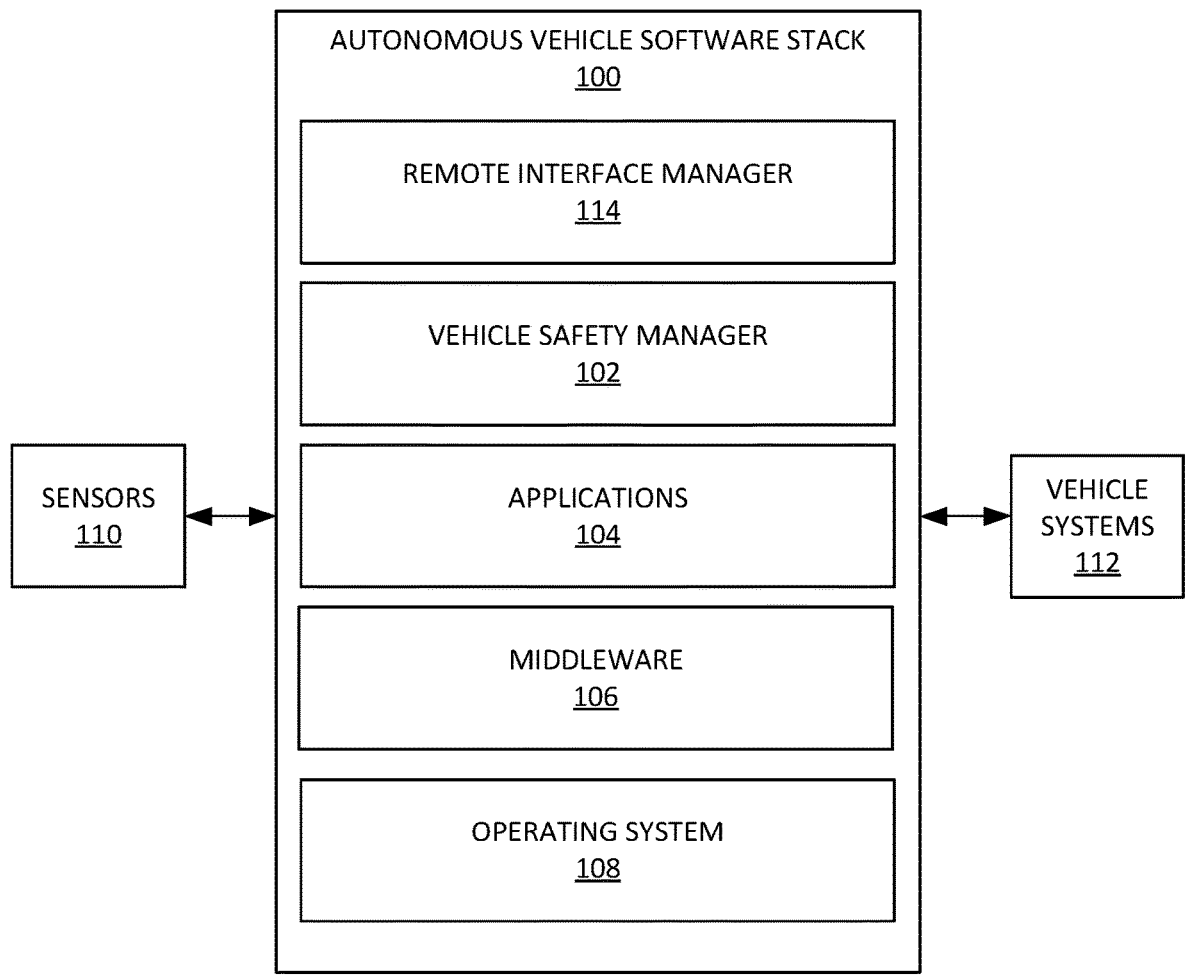
FIG. 1B depicts an example autonomous vehicle management system wherein the AVMS is implemented primarily in software, according to some embodiments.

As indicated above, autonomous vehicle management system 122 may be implemented using software only, hardware only, or combinations thereof. FIG. 1B depicts an example autonomous vehicle management system wherein autonomous vehicle management system 122 is implemented primarily in software, according to some embodiments. Autonomous vehicle management system 122 may be implemented as a fully autonomous vehicle software stack 100. Fully autonomous vehicle software stack 100 can include a vehicle safety manager 102, a remote interface manager 114, applications 104, middleware 106, and operating system 108. Fully autonomous vehicle software stack 100 may be used to implement the functionalities of the various systems and subsystems described above.

Figure 2A:
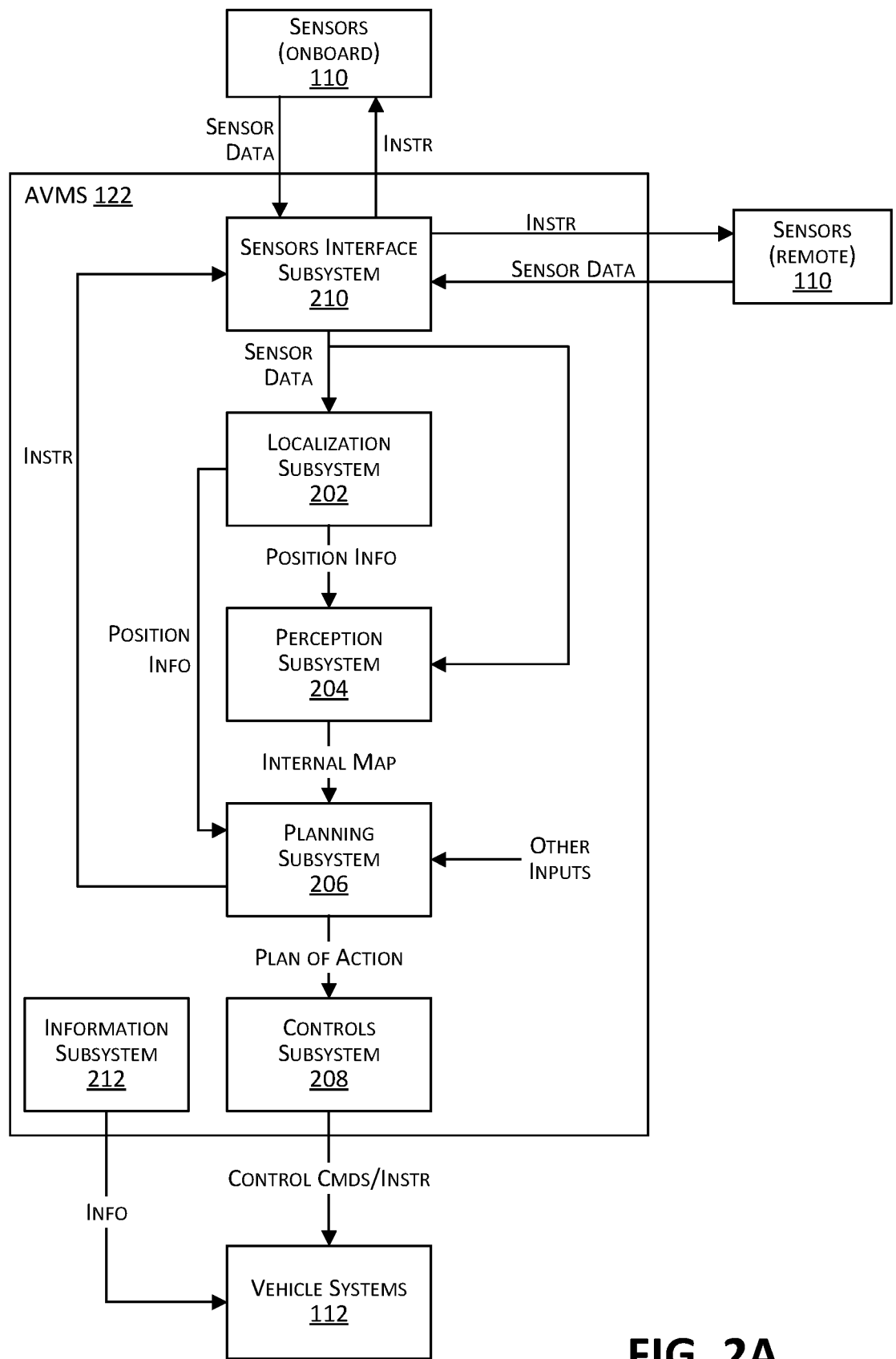
FIG. 2A is a simplified block diagram depicting subsystems of an AVMS according to some embodiments.

FIG. 2A is a simplified block diagram depicting subsystems of autonomous vehicle management system 122 according to some embodiments. Autonomous vehicle management system 122 may comprise multiple systems or subsystems communicatively coupled to each other via one or more communication channels. In the embodiment depicted in FIG. 2A, the subsystems include a sensors interface subsystem 210, a localization subsystem 202, a perception subsystem 204, a planning subsystem 206, a controls subsystem 208, and an information subsystem 212.

Autonomous vehicle management system 122 depicted in FIG. 2A is merely an example and is not intended as limiting. One of ordinary skill in the art would recognize many possible variations, alternatives, and modifications. For example, in some implementations, autonomous vehicle management system 122 may have more or fewer subsystems or components than those shown in FIG. 2A, may combine two or more subsystems, or may have a different configuration or arrangement of subsystems. The subsystems may be implemented using software only, hardware only, or combinations thereof. In the embodiment depicted in FIG. 2A, autonomous vehicle management system 122 and all its subsystems are shown as being in or on autonomous vehicle 120. This is however not intended to be limiting. In alternative embodiments, all the subsystems of autonomous vehicle management system 122 or certain subsystems of autonomous vehicle management system 122 can also be remote from autonomous vehicle 120.

Sensors interface subsystem 210 provides an interface that enables communications between sensors 110 (including on-board sensors and/or remote sensors) and autonomous vehicle management system 122. Sensors interface subsystem 210 may receive sensor data from sensors 110 and provide the data to one or more other subsystems of autonomous vehicle management system 122. For example, as depicted in FIG. 2A, sensor data may be provided to localization subsystem 202 and perception subsystem 204 for further processing. The sensor data collected by the various sensors 110 enables autonomous vehicle management system 122 to construct a view or picture of autonomous vehicle 120 and its surrounding environment.

In certain embodiments, one or more subsystems of autonomous vehicle management system 122 can send instructions or commands to one or more sensors 110 to control the operations of the one or more sensors. For example, instructions may be sent to a particular sensor to change the behavior of the particular sensor. For example, instructions may be sent to a sensor to change the information sensed or collected by the sensor and/or to change the sensor data communicated from the sensor to autonomous vehicle management system 122. Using these instructions, autonomous vehicle management system 122 can dynamically control the sensor data that is communicated from sensors 110 to autonomous vehicle management system 122. Further details are provided below in the context of functions performed by planning subsystem 206.

Localization subsystem 202 is configured to receive sensor data from sensors 110 and, based upon the sensor data, to identify the location of autonomous vehicle 120 in its surrounding environment (vehicle localization). Localization subsystem 202 provides current, local position information of the ego vehicle with respect to its environment (example: a mine). The position of the ego vehicle may be determined with respect to a pre-defined map that is generated by perception subsystem 204. In certain embodiments, localization subsystem 202 is configured to broadcast the ego vehicle's position information to other systems or subsystems of autonomous vehicle 120. The other systems or subsystems may then use the position information as needed for their own processing.

Localization subsystem 202 may implement various functions such as internal map management, map matching, visual odometry, dead reckoning, location history management, and the like. For example, assume that autonomous vehicle 120 is driving in a mine. Localization subsystem 202 may receive as input a map of the mine. A mine usually has a set path comprising drivable and non-drivable areas and a set road for mining vehicles to follow around a mine. Localization subsystem 202 may determine the position of the ego vehicle along the path. Localization subsystem 202 may do so by utilizing multiple inputs it receives from sensors and maps of the environment. Localization subsystem 202 may use GPS sensor data to determine the global positioning of the ego vehicle. Localization subsystem 202 may receive the GPS sensor data and translate it to a more useful form that is usable by one or more other subsystems of autonomous vehicle management system 122. For example, localization subsystem 202 may identify where the ego vehicle is positioned with respect to a map of the environment, such as a mine map. (Identification of the ego vehicle's position with respect to a map is also referred to as map management).

Localization subsystem 202 may also be configured to perform map matching, where what localization subsystem 202 perceives is matched with the information that it has. Map matching can match recorded geographic coordinates to a logical model of the real world (e.g., using a Geographic Information System model, etc.). In one example, a map matching algorithm can obtain a recorded series of location points (e.g. from GPS) and relate them to edges in an existing street graph (e.g., as a network). This can be in a sorted list representing the travel of an autonomous vehicle. As part of map matching, localization subsystem 202 can track the ego vehicle in its environment and deduce its position based on what localization subsystem 202 sees relative to a map, such as a real world map.

Localization subsystem 202 may also be configured to perform visual odometry, which involves determining the orientation and position of the ego vehicle based upon sensor data, such as by analyzing images captured by one or more cameras.

Localization subsystem 202 may also perform dead reckoning processing. Dead reckoning is the process of calculating one's current position by using a previously determined position, or fix, and advancing that position based upon known or estimated speeds over elapsed time and course. This may involve calculating the ego vehicle's position by estimating the direction and distance travelled. For example, autonomous vehicle management system 122 can receive and maintain certain information about autonomous vehicle 120 such as its wheel speed, steering angle, where autonomous vehicle 120 was a second ago, and the like. Based on the past position information and in combination with speed, steering angle etc., localization subsystem 202 can determine the vehicle's next location or current location. This provides local understanding of the ego vehicle's position as it moves on its path. A path can be a road, highway, rail system, runway, boat route, bike path, etc., according to various embodiments.

Localization subsystem 202 may also perform local history management tracking, where historical information about the ego vehicle's path is analyzed and compared to the current path. For example, if autonomous vehicle 120 drives along a certain path in a mine multiple times, information from different instances of driving along the path can be compared and analyzed by localization subsystem 202.

Localization subsystem 202 may also implement a consistency module that is configured to perform rationality checks, deficiency checks, normalize sensor data, etc. For example, localization subsystem 202 may receive information from different sources of information regarding the ego vehicle's position, location, etc. A rationality check may be used to do a validity check to make sure information from various sensors is consistent and robust. This helps reduce erroneous results. The rationality check can include tests to evaluate whether a sensor data value and/or the result of a calculation can possibly be true given other sensor data values and/or calculation results. The sensor data received from sensors 110 can also be normalized and the normalized sensor data then provided to localization subsystem 202. Localization subsystem 202 can then utilize the normalized sensor data to generate and/or update the consistent internal map of the real-time (e.g., assuming networking and processing latencies, etc.) environment of the autonomous vehicle.

Perception subsystem 204, periodically or on-demand, receives sensor data from sensors 110 and builds and maintains a consistent internal map based upon the received information. Perception subsystem 204 may also receive inputs from other sources, such as from localization subsystem 202, and use the received inputs to build and maintain the internal map. The internal map generated by perception subsystem 204 contains all the information including the ego vehicle's information, state of the ego vehicle and its environment, information about objects in the ego vehicle's environment (e.g., information regarding dynamic and static objects around the ego vehicle). A consistent internal map can be a localized map of sensed entities/objects in the autonomous vehicle's environment, for example, around the autonomous vehicle. In certain embodiments, these sensed entities/objects are mapped in three dimensions (3D). In certain embodiments, perception subsystem 204 receives position information from localization subsystem 202 and incorporates the position information in the internal map. The internal map can be maintained even in the event that a sensor falls offline.

Rationality checks and normalization may be performed on the sensor data received by perception subsystem 204. These checks can include tests to evaluate whether a sensor data value and/or the result of a calculation can possibly be true. The sensor data received from sensors 110 can also be normalized and the normalized sensor data then provided to perception subsystem 204. Perception subsystem 204 can then utilize the normalized sensor data to generate and/or update the consistent internal map of the real-time environment of the autonomous vehicle.

Perception subsystem 204 may use various different algorithms and techniques to perform its functions, including artificial intelligence (AI) and machine learning based techniques. For example, perception subsystem 204 may use a convolutional neural network (CNN) or other deep-learning neural network (DNN) to perform object detection and object classification based upon the sensor data. During a training phase, the DNN may be trained using labeled training data comprising sample images of a vehicle's environment and corresponding ground truth classifications. Labeled data generally includes a group of sample images that have been tagged with one or more labels, where the labels represent known results (e.g., ground truth classification, etc.) for the sample images. Labeling can also be used to take a set of unlabeled data and augment each piece of that unlabeled data with meaningful tags that are informative. A CNN model or other AI/machine learning model built based upon labeled training data may then be used in real time to identify and classify objects in the environment of autonomous vehicle 120 based upon new sensor data received from sensors 110.

Planning subsystem 206 is configured to generate a plan of action for autonomous vehicle 120. The plan may comprise one or more planned actions or operations to be performed by autonomous vehicle 120. For example, the plan may comprise information identifying a trajectory or path to be traversed by autonomous vehicle 120. A path can be a road, highway, rail system, runway, boat route, bike path, etc., according to various embodiments. For example, the trajectory information may indicate how the vehicle should move from point A to point B with a list of points between point A point B marking a trajectory for the vehicle to follow from point A to point B. As another example, the plan generated by planning subsystem 206 may include planned actions with respect to accessories of autonomous vehicle 120, such as turning indicators or lights on or off, producing one or more sounds (e.g., alarms), and the like. In situations where autonomous vehicle 120 has specialized components that are customized to perform specialized operations, the plan generated by planning subsystem 206 may also include planned actions to be performed by one or more of these specialized components. For example, if the autonomous vehicle is a digging truck with a bucket and arm assembly for performing the digging and moving of materials, the plan generated by planning subsystem 206 can include actions to be performed by the bucket and arm assembly for performing the digging. For example, the plan may include an angle at which the arm should be raised and or the angle of the bucket with respect to the arm. After a plan of action has been generated, planning subsystem 206 may communicate the plan of action to controls subsystem 208, which may then control one or more systems of vehicle systems 112 to cause the planned actions in the plan of action to be performed in a safe manner by autonomous vehicle 120.

In addition to the internal map generated by perception subsystem 204, planning subsystem 206 may also receive various other inputs that it uses in generating the plan of action for autonomous vehicle 120. These inputs may include, without limitation: (a) position or localization information received from localization subsystem 202; (b) information identifying one or more goals of autonomous vehicle 120 (examples are described below); (c) high level route information regarding the path or route to be taken by autonomous vehicle 120 (which may be provided directly or indirectly by an end user or operator of the autonomous vehicle); (d) information identifying safety considerations (examples are described below); (e) information about how a particular operation was performed in the past (examples are described below; and (f) other information.

Information identifying a goal may be set by an end user or operator of the autonomous vehicle or machine. For an automotive example, the user may set a high-level goal to drive from the current location of autonomous vehicle 120 to a particular final destination. Autonomous vehicle 120 may determine a GPS route plan based upon the current and final destination locations and a map showing existing roads, with a goal to autonomously drive from the current location to the final destination according to the GPS route plan. In a mining environment example, a high-level goal set by an operator may be to move ten tons of material (e.g., sand, coal, etc.) from point A and dump the material at point B. In general, one or more different goals may be provided. Examples of categories of goals (some of which may overlap) include, without limitation: goals related to performing an autonomous operation by the autonomous vehicle (e.g., autonomous driving or navigation along a path, scooping and dumping operations, moving materials or objects, lifting materials, driving, rolling, spreading dirt, excavating, transporting materials or objects from one point to another point, etc.); goals related to maneuvering the vehicle (e.g., turning through a particular angle); goals related to interaction of the vehicle with various actors, objects, etc. in the vehicle's environment; goals related to the general operations of the vehicle; and the like. Examples of goals include: changing lanes, driving from one location to another location, driving to a destination as fast as possible, making a turn, performing a series of steps in a sequence, and others.

Information identifying safety considerations may be provided to the autonomous vehicle by an end user/operator, etc. using APIs provided by autonomous vehicle 120 or via metadata configured for autonomous vehicle 120. Examples of information identifying safety considerations may include, without limitation: always stay within the lane, maintain certain minimum distance from any object at all time, a dump truck is not to make more than a 30 degree turn, a loader B is not to climb over a grade more than 15 degrees, etc.

Information about how a particular operation was performed in the past may include, for example, history information indicating how that particular autonomous vehicle performed the operation in the past, how a different autonomous vehicle performed the operation in the past, how the operation was manually performed using a vehicle in the past (e.g., how a driver/operator performed the operation in the past with the vehicle operating under the driver/operator's control). For example, the autonomous vehicle traveled a path in the past, how a manual truck would have driven this path or completed a certain task, and the like.

Based upon the one or more inputs, planning subsystem 206 generates a plan of action for autonomous vehicle 120. Planning subsystem 206 may update the plan on a periodic basis as the environment of autonomous vehicle 120 changes, as the goals to be performed by autonomous vehicle 120 change, or in general, responsive to changes in any of the inputs to planning subsystem 206.

As part of generating and updating the plan of action, planning subsystem 206 makes various decisions regarding which actions to include in the plan in order to achieve a particular goal in a safe manner. Processing performed by planning subsystem 206 as part of making these decisions may include behavior planning, global planning, path planning, fail-safe path, path history tracking, etc.

Planning subsystem 206 may use various AI-based machine-learning algorithms to generate and update the plan of action in order to achieve the goal of performing a function or operation (e.g., autonomous driving or navigation, digging of an area) to be performed by autonomous vehicle 120 in a safe manner. For example, in certain embodiments, planning subsystem 206 may use a model trained using reinforcement learning (RL) for generating and updating the plan of action. Reinforcement learning (RL) is an area of machine learning inspired by behaviorist psychology, concerned with how agents ought to take actions in an environment so as to maximize some notion of cumulative reward. Autonomous vehicle management system 122 may use an RL model to select actions to be performed for controlling an autonomous operation of autonomous vehicle 120. The RL model may be periodically updated to increase its coverage and accuracy.

In certain embodiments, in addition to generating a plan of action, planning subsystem 206 is capable of dynamically controlling the behavior of sensors 110. For example, planning subsystem 206 can send instructions or commands to a particular sensor from sensors 110 to dynamically control the sensor data that is captured by the particular sensor and/or control the sensor data that is communicated from the sensor to perception subsystem 204 (or to other subsystems of autonomous vehicle management system 122, such as to localization subsystem 202). The internal map built by perception subsystem 204 is based upon the sensor data received by perception subsystem 204 from the sensors. Accordingly, being able to dynamically control the sensor data received from the sensors allows planning subsystem 206 to dynamically control the information included in and/or used by perception subsystem 204 to build and maintain the internal map. Planning subsystem 206 can dynamically and on-demand direct sensors 110 to obtain specific types of information or behave in specified manners, for example, to provide additional sensor data to update the consistent internal map. For example, planning subsystem 206 can command a LIDAR sensor to narrow its range of sensing from a three-hundred and sixty-degree (360°) view to a narrower range that includes a specific object to be sensed and/or tracked in greater detail by the LIDAR system. In this way, the consistent internal map can be updated based on feedback from and under the control of planning subsystem 206.

Autonomous vehicle management system 122 provides an infrastructure that enables planning subsystem 206 (or other subsystems of autonomous vehicle management system 122) to send one or more instructions or commands to one or more sensors to control the behavior of those one or more sensors. In the embodiment depicted in FIG. 2A, sensors interface subsystem 210 provides an interface for interacting with sensors 110. In the outbound direction (from autonomous vehicle management system 122 to the sensors direction), planning subsystem 206 can send an instruction or command to sensors interface subsystem 210. Sensors interface subsystem 210 is then configured to communicate the received instruction to the intended destination sensor. In the inbound direction (from a sensor to autonomous vehicle management system 122), sensors interface subsystem 210 may receive sensor data from a sensor in response to the instruction sent from planning subsystem 206. Sensors interface subsystem 210 may then communicate the received sensor data to planning subsystem 206 (or to the appropriate subsystem of autonomous vehicle management system 122 which originated the instruction).

Sensors interface subsystem 210 may be capable of communicating with different sensors using one or more different communication protocols. In certain embodiments, in the outbound direction, for an instruction or command received from planning subsystem 206 (or from any other subsystem of autonomous vehicle management system 122) to be sent to a particular sensor, sensors interface subsystem 210 may translate the instruction to a format that is understandable by and appropriate for communicating with that particular sensor and then use a particular communication protocol that is applicable for that particular sensor.

In certain embodiments, autonomous vehicle management system 122 may have access to information identifying sensors 110 and their capabilities. The subsystems of autonomous vehicle management system 122 may then access and use this stored information to determine the capabilities and behaviors of a sensor and to send instructions to that sensor to change its behavior. In certain embodiments, a sensor has to be registered with autonomous vehicle management system 122 before communication is enabled between the sensor and autonomous vehicle management system 122. As part of the registration process, information related to the sensor being registered may be provided. This information may include information identifying the sensor, the sensor's sensing capabilities and behaviors, communication protocol(s) usable by the sensor, and other information related to the sensor. Autonomous vehicle management system 122 may then use this information to communicate with and control the behavior of the sensor.

As indicated above, planning subsystem 206 may send instructions to a sensor to control and change the sensor's behavior. Changes in a sensor's behavior can include changing the sensor data that is communicated from the sensor to autonomous vehicle management system 122 (e.g. the sensor data communicated from the sensor to perception subsystem 204, or other subsystems of autonomous vehicle management system 122), changing the data that is collected or sensed by the sensor, or combinations thereof. For example, changing the sensor data that is communicated from the sensor to autonomous vehicle management system 122 can include communicating more or less data than what was communicated from the sensor to autonomous vehicle management system 122 prior to receiving the instruction, and/or changing the type of sensor data that is communicated from the sensor to autonomous vehicle management system 122. In some instances, the data sensed or collected by the sensor may remain the same but the sensor data communicated from the sensor to autonomous vehicle management system 122 may change. In other instances, the data sensed or collected by the sensor may itself be changed in response to an instruction received from autonomous vehicle management system 122. Planning subsystem 206 may also be able to turn a sensor on or off by sending appropriate instructions to the sensor.

For example, planning subsystem 206 may receive inputs including a current internal map generated by perception subsystem 204, position information from localization subsystem 202, and a goal that autonomous vehicle 120 is to make a turn in a certain amount of time (e.g., a right turn in the next 5 seconds). As part of deciding what is the best set of actions to be taken by autonomous vehicle 120 to achieve the goal in a safe manner, planning subsystem 206 may determine that it needs particular sensor data (e.g., additional images) showing the environment on the right side of autonomous vehicle 120. Planning subsystem 206 may then identify one or more sensors (e.g., cameras) that are capable of providing the particular sensor data (e.g., images of the environment on the right side of autonomous vehicle 120). Planning subsystem 206 may then send instructions to these one or more sensors to cause them to change their behavior such that the one or more sensors capture and communicate the particular sensor data to autonomous vehicle management system 122 (e.g., to perception subsystem 204). Perception subsystem 204 may use this specific sensor data to update the internal map. The updated internal map may then be used by planning subsystem 206 to make decisions regarding the appropriate actions to be included in the plan of action for autonomous vehicle 120. After the right turn has been successfully made by autonomous vehicle 120, planning subsystem 206 may send another instruction instructing the same camera(s) to go back to communicating a different, possibly reduced, level of sensor data to autonomous vehicle management system 122. In this manner, the sensor data that is used to build the internal map can be dynamically changed.

Examples of changes in a sensor's behavior caused by an instruction received by the sensor from autonomous vehicle management system 122 may include, without limitation:

Cause a sensor to reduce, or even shut off, sensor data that is communicated from the sensor to autonomous vehicle management system 122. This may be done, for example, to reduce the volume of sensor data received by autonomous vehicle management system 122. Using the same example from above, where planning subsystem 206 receives an input indicating that a goal of the autonomous vehicle 120 is to make a right turn, planning subsystem 206 may decide that it requires reduced sensor data with respect to the left environment of autonomous vehicle 120. Planning subsystem 206 may then identify one or more sensors (e.g., cameras) that are responsible for communicating the sensor data that is to be reduced. Planning subsystem 206 may then send instructions to these one or more sensors to cause them to change their behavior such that the amount of sensor data communicated from these sensors to autonomous vehicle management system 122 (e.g., to perception subsystem 204) is reduced.

Cause a sensor to change its field of view. For example, causing a camera or a LIDAR sensor to zoom in to a narrow location or to reorient to a particular pose.

Cause a sensor to only send partial information. For example, the sensor may send less than all the information captured by the sensor.

Cause a sensor to send information faster or slower than before or than a regular rate.

Cause a sensor to turn on.

Cause a sensor to capture and/or send information to autonomous vehicle management system 122 at a different resolution or granularity then before.

Figure 2B:
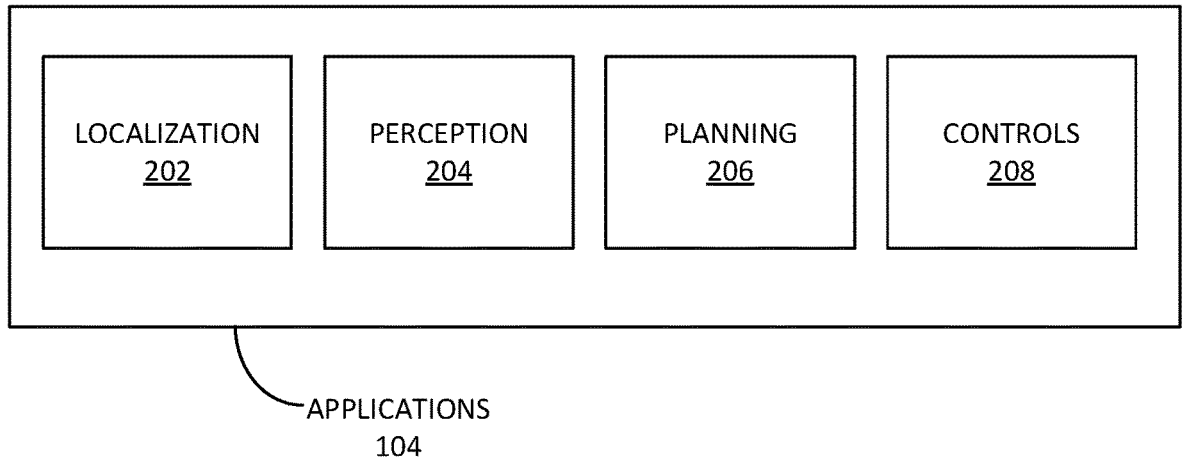
FIG. 2B illustrates software modules that may be used to implement the various subsystems of an AVMS according to some embodiments.

FIG. 2B illustrates software modules (e.g., program, code, or instructions executable by one or more processors of autonomous vehicle 120) that may be used to implement the various subsystems of autonomous vehicle management system 122 according to certain embodiments. The software modules may be stored on a non-transitory computer medium. As needed, one or more of the modules or executable images of the modules may be loaded into system memory (e.g., RAM) and executed by one or more processors of autonomous vehicle 120. In the example depicted in FIG. 2B, software modules are shown for implementing localization subsystem 202, perception subsystem 204, planning subsystem 206, and controls subsystem 208.

Figure 4:
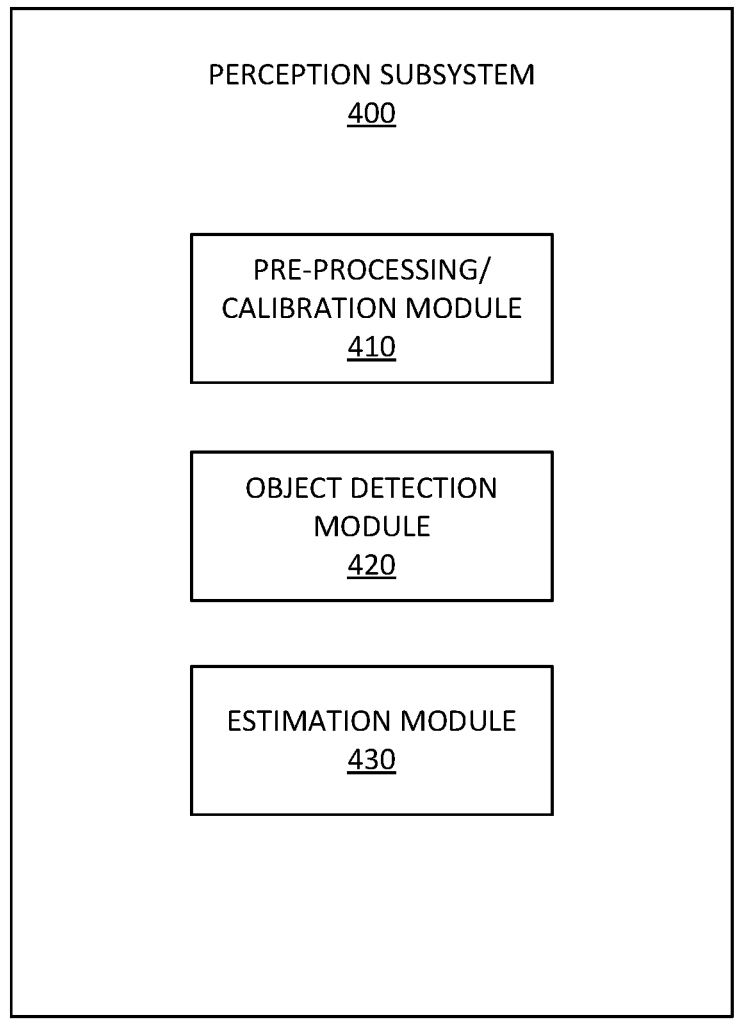
FIG. 4 is a simplified block diagram of a perception subsystem in an autonomous machine according to some embodiments.

FIG. 4 is a simplified block diagram of a perception subsystem 400 in an autonomous machine (e.g., autonomous vehicle 120) according to some embodiments. The perception subsystem 400 can be used to implement the perception subsystem 204 in FIG. 2A. As depicted in FIG. 4, the perception subsystem 400 may include a pre-processing module 410, an object detection module 420, and an estimation module 430. Each of the modules 410, 420, and 430 can be implemented in software only, hardware only, or combinations thereof. The perception subsystem 400 depicted in FIG. 4 is merely an example. One of ordinary skill in the art would recognize many possible variations, alternatives, and modifications. For example, in some implementations, perception subsystem 400 may have more or fewer subsystems or components than those shown in FIG. 4, may combine two or more subsystems, or may have a different configuration or arrangement of subsystems. Further, certain components of the perception subsystem have been intentionally omitted so as not to obscure the description of aspects of the perception subsystem which relate to volumetric estimation.

Pre-processing module 410 is configured to condition and/or reformat obtained sensor data in preparation for further processing by the object detection module 420. Formatting may involve transforming data produced by one sensor and data produced by a second sensor into a shared format and/or shared frame of reference. For example, sensors may capture data at different rates (e.g., two cameras capturing data at different frames per second, or a radar sensor operating at a different frequency than a LIDAR sensor). Thus, as part of the processing performed by the pre-processing module 410, data captured from sensors operating at different rates may be reformatted so as to enable the sensor data to subsequently be combined in a coherent manner, e.g., merging or grouping together of data captured by different sensors but corresponding to the same time period. As another example, sensors may be located at different places (e.g., different locations on a body of the autonomous vehicle) and/or oriented differently (e.g., two cameras pointed in slightly different directions for generating stereoscopic images). If a first sensor captures an object in a particular position and a second sensor captures the same object in different position (e.g., due a difference in the perspective of the second sensor relative to the first sensor), pre-processing module 410 may perform a geometric correction to ensure that the object is represented in the sensor data from both sensors as a single object and not two separate objects.

Conditioning of sensor data may involve any number of operations that improve the quality of the sensor data. The conditioning may vary depending on the type of sensor. For example, camera pre-processing may involve image size or resolution adjustments (e.g., to scale down a large image to a smaller size for faster downstream processing) and corrective image processing (e.g., lens correction, aberration correction, white balancing, aperture correction, and the like). Camera pre-processing may also involve combining different images into a single image (e.g., as an average of a set of images). Other types of conditioning operations include operations to eliminate noise or unneeded information (e.g., cropping of images, eliminating LIDAR data captured outside of a certain field of view, removing data corresponding to objects or regions that are not of interest (e.g., the ground), etc.).

Pre-processing module 410 may also be configured to perform calibration of sensors to change the sensor behavior and/to compensate for non-ideal sensor behavior. Examples of changing the behavior of a LIDAR or radar sensor include adjusting a reflectivity parameter to change the operating range of the LIDAR/radar sensor (e.g., to prevent capturing of data beyond a certain distance when an object of interest, such as pile, is known to be less than that distance away from the vehicle) and changing the field of view captured by the LIDAR/radar sensor (e.g., from 360 degrees to 270 degrees). An example of a corrective camera calibration is the estimation of parameters for a lens and/or image sensor in a camera to enable the estimated parameters to be used to correct for lens distortion during subsequent image capture. Thus, pre-processing can involve operations performed prior to capturing sensor data as well as post-capture operations. Calibration can include intrinsic calibrations (e.g., adjusting the behavior of a sensor based on data captured by the same sensor) and/or extrinsic calibrations (e.g., adjusting the behavior of a sensor based on data from another sensor).

In certain embodiments, calibration of a camera involves calculating an extrinsic matrix for the camera. The extrinsic matrix represents the camera's pose and is a transformation matrix comprising values indicating a geometric transformation (e.g., translation and/or rotation) needed to map the camera's frame of reference to some other frame of reference (e.g., the reference frame of a LIDAR sensor). The extrinsic matrix can be calculated as a 3×4 matrix using a checkerboard calibration technique, in which a 3D calibration rig featuring a checkerboard pattern is placed within view of the camera and then captured to determine matrix parameters that map a point or feature in the checkerboard image to a corresponding point or feature in the other frame of reference. For example, a corner of the calibration rig as represented in the checkerboard image can be mapped to a corner of the calibration rig as represented in a point cloud generated by a LIDAR sensor. The calculation of the extrinsic matrix can be performed as a one-time setup involving the use of a perspective-n-point (PnP) algorithm that estimates the camera pose given a set of n number of 3D points and their corresponding two-dimensional (2D) projections in a camera image. Once calculated, the extrinsic matrix can be used to combine data from a camera with data from another sensor, for example, to merge 2D camera images with 3D data from other sensors (e.g., LIDAR point clouds) or to merge 2D camera images from two different cameras to form a depth image based on a disparity between the camera images.

Object detection module 420 is configured to receive the pre-processed sensor data from pre-processing module 410 and to determine which portions of the sensor data correspond to a particular class (or multiple classes) of object. Object detection module 420 may partition sensor data into segments, where each segment is represented by an enclosed 2D or 3D boundary. For example, segmenting a 2D image captured by a camera may involve generating a border around a group of pixels based on determining that the pixels belong to the same object. Segmentation is typically performed concurrently with classification (determining the class of each segment). The process of dividing an input representation into segments of one or more classes is sometimes referred to as semantic segmentation. Semantic segmentation can be viewed as forming a mask by which the input representation is filtered, where the mask comprises shapes that are labeled according to the type of object to which the shape corresponds. LIDAR or radar data (e.g., a 3D point cloud) can also be segmented, for example, by generating a 3D surface (e.g. a geometric mesh) representing the boundaries of an object. Segmentation can be performed algorithmically (e.g., using a software algorithm that performs geometric calculations to generate a surface of polygons as a geometric mesh) or using a machine learning (ML) model trained to infer the boundaries of an object from sensor data.

Object detection does not necessarily involve identifying every object captured in the sensor data. Instead, objection detection module 420 can be configured to detect only objects of interest, such as piles of material, other vehicles, human beings, road markings, barriers, terrain, or the like. In certain embodiments, detection of objects of interest can be performed by an AI or ML model, for example, a CNN that has been trained to detect objects that have particular shapes or other DNN that has been trained to distinguish and label different types of objects. The object detection module 420 can combine detection techniques, with different detection techniques being applied depending on the source of sensor data.

When performing segmentation, the object detection module 420 may classify segments according to a set of predefined categories or classes of objects. The types of classes recognized by the object detection module 420 may vary depending on the environment in which the autonomous machine is deployed. For instance, an object detection module designed for mining equipment may be trained or otherwise configured to recognize segments that correspond to a pile of dirt, terrain (e.g., soil or grass), the sky, humans, mining vehicles, traffic cones, and the like.

Object detection module 420 generates one or more representations of a physical environment and/or an object of interest using sensor data received from the pre-processing module 410. For instance, object detection module 420 may generate a segmented 2D image as a substitute for a 2D camera image, where the pixels of the original 2D image are replaced with pixels corresponding to shapes defined by the borders identified during segmentation processing. The color values of the pixels in the segmented image may be set according to the class of the object. In this manner, the original image can be simplified by removing extraneous visual information while making it easier to distinguish objects of different classes. In some embodiments, the color of the pixels in a segment may be kept substantially the same as in the original image, except that an outline is drawn around the border of the segment. The replacement image may be augmented with labels describing the objects (e.g., text or metadata describing the class of object). As another example, the object detection module 420 may generate a voxel representation of an object using a LIDAR point cloud (e.g., a 3D stack of cubes approximating the shape of the object as indicated by the points in the point cloud).

Estimation module 430 is configured to receive disparate representations from the object detection module 420 and to combine the disparate representations into a single representation for analysis by estimation module 430 and/or as an output for downstream processing. For example, estimation module 430 may generate a 3D representation of a particular object from a segmented image and a voxel representation, where the 3D representation represents the geometry of the object more accurately than either the segmented image or the voxel representation alone. In certain embodiments, the 3D representation generated by estimation module 430 is a smoothed voxel representation or a digital elevation model (DEM) representing the surface of an object of interest. The 3D representation may comprise a grid of boxes and, for each box within the grid, information indicating the height of the box (e.g., the total number of voxels occupied between a ground surface and the top of the object at a particular location along the object's surface). In certain embodiments, the 3D representation generated by estimation module 430 is used to update the internal map described earlier, in connection with the embodiment of FIG. 2A, as containing information about objects in the ego vehicle's environment as well as information about the state of the ego vehicle.

Estimation module 430 may use the 3D representation to estimate one or more characteristics of an object of interest, such as the height, volume, or material composition of the object. Such estimates may be quantitative or qualitative depending on the characteristic. In various embodiments, these characteristics may facilitate the performing of various tasks by an autonomous machine. For instance, size of an object may be used to determine whether the object can be lifted or moved. In certain embodiments, estimation module 430 may be configured to communicate the estimated characteristics and/or 3D representation to another autonomous machine (e.g., to the perception subsystem of another autonomous vehicle nearby) to enable the other autonomous machine to perform one or more tasks based on such information.

In certain embodiments, object detection module 420 and estimation module 430 may be implemented on a high-speed computing platform for processing sensor data efficiently at a high throughput. For example, the sensors and the various computing resources (processors, memory, etc.) that form the object detection module 420 and the estimation module 430 may be coupled by one or more high-speed communication networks (e.g., Gigabit Ethernet) and may perform processing in a pipelined fashion so that sensor data is collected and processed in real-time.

In certain embodiments, the object detection module 420 includes one or more machine learning models. Each ML model in the object detection module 420 receives pre-processed sensor data as input. An ML model can receive one or more types of sensor data. For example, separate ML models can be provided for camera data and LIDAR data, or a single ML model can receive camera, LIDAR, and radar data. The sensor data received by an ML model comprises a 2D or 3D representation of a physical environment as captured by a sensor. For example, the sensor data may comprise a 2D image generated by a camera and/or a 3D point cloud generated by a LIDAR sensor. An ML model can be trained to generate inferences based on the sensor data. For instance, an ML model may infer, from the color values of each pixel in a 2D image, which regions of the image correspond to a pile or other object of interest. The ML model may output the inferences in the form of an additional 2D or 3D representation, of the object alone or the object within the environment. For example, in certain embodiments, an ML model is trained to infer the boundaries of different classes of objects based on color information from a camera image, and to output a segmented image indicating the boundaries of each object detected by the ML model. Training generally involves providing a set of training representations as input to the ML model, comparing the resulting inferences to ground truth information corresponding to correct inferences, and adjusting the behavior of the ML model based on the difference between the actual inferences and the correct inferences.

As described above, AVMS 122 relies on object detection and identification by perception subsystem 204 to provide input to planning subsystem 206 and controls subsystem 208. Thus, accurate object detection and identification is important to safe operation of the autonomous vehicle. In industrial environments, such as construction sites, mines, quarries, or the like, machines (including the ego vehicle) working in the environment, or ambient airflow, may stir up dust. Perception subsystem 204 may incorrectly identify dust as a solid object, and this may result in behavior such as stopping the autonomous vehicle from driving through the dust, selecting an alternative path to avoid the dust, or the like. Such unnecessary stopping or detouring can reduce productivity of the autonomous vehicle. Accordingly, it is desirable for a control system of an autonomous machine (such as AVMS 122) to distinguish dust from solid objects.

Figure 5:
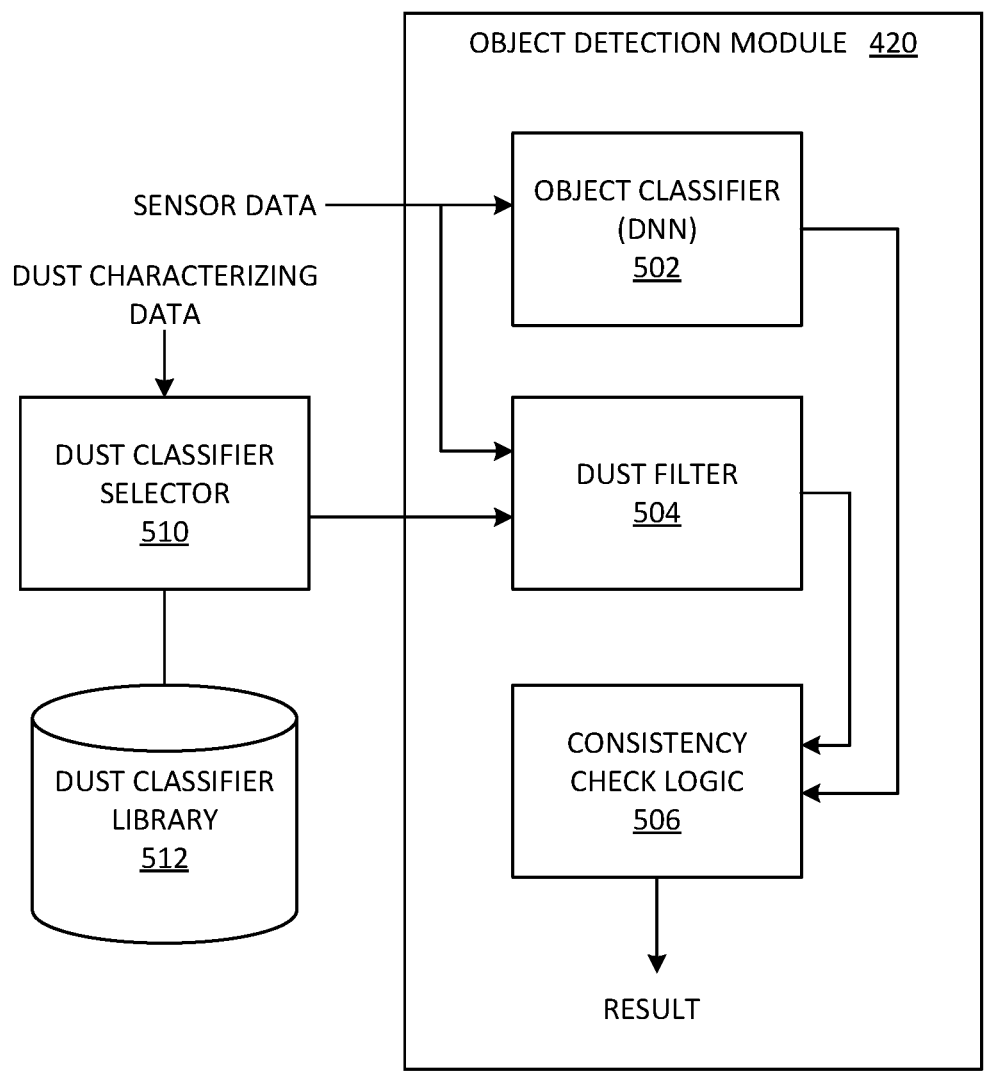
FIG. 5 shows a more detailed block diagram of an implementation of an object detection module that incorporates dust detection and filtering according to some embodiments.

FIG. 5 shows a more detailed block diagram of an implementation of object detection module 420 that incorporates dust detection and filtering according to some embodiments. Object detection module 420 includes an object classifier 502, which can be implemented using a CNN or other DNN as described above. Object detection module 420 also includes a dust filter 504 and consistency check logic 506.

Dust filter 504 can operate in parallel with object classifier 502. Both can receive sensor data from any or all of the sensors described above. In some embodiments, the sensor data may be preprocessed to provide image data, e.g., as described above with reference to pre-processing module 410 of FIG. 4. In some embodiments, dust filter 504 uses image data incorporating a combination of camera data and LIDAR data and applies a trained dust classifier to the image data in order to identify regions of dust within a field of view of the sensors.

In some embodiments, multiple dust classifiers are made available because different types of dusty environments may affect the sensors differently. Accordingly, operation of dust filter 504 can be controlled by dust classifier selector 510, which determines a particular dust classifier to be applied. In some embodiments, dust classifier selector 510 has access to a library 512 of different dust classifiers. Dust classifier library 512 can be implemented using any computer-readable storage medium or system, including local storage (magnetic disk, flash memory, etc.) or remote storage accessible via a network interface.

Each dust classifier can be a state vector machine (SVM), clustering method, logistic regression, K-nearest neighbor, or other classification model that has been trained using sensor data from a particular category of dusty environment. Examples of different categories of dusty environments include:

Construction sites, which may be further categorized based on geographic location, type of construction (e.g., road, building), day vs. night etc.

Mines, which may be further subdivided based on the material that is being mined (e.g., copper, gold, iron, etc.), mine type (e.g., whether the mine is subterranean or open pit), and/or geographic location (e.g., a gold mine in Arizona can be different from a gold mine in Australia).

Activity categories, such as whether operations such as digging that may generate dust are occurring, or whether the ego vehicle is moving in a forward or reverse direction (which can affect the distribution and other characteristics of dust).

It should be understood that these examples of categories of dusty environments are illustrative and not limiting. Categories can be defined with any degree of specificity desired, from highly general (e.g., mining site vs. construction site, or gold mine vs. copper mine) to highly specific (e.g., a particular gold mine for which sufficient sensor data is available to train a dust classifier), and any number and combination of categories can coexist.

Training of a dust classifier for each category of dusty environment can be performed using conventional training techniques. For example, sensor data (or images based on sensor data) collected at one or more sites that fit the definition of a particular category of dusty environment can be labeled (or annotated) to indicate ground truth values as to where airborne dust is present or absent. A classification model, such as an SVM, clustering model, logistic regression model, K-nearest neighbor model, or other classification model can be trained using the annotated images. In some embodiments, the dust classifier is trained to provide one of three output states (e.g., indicated by different numerical values or other codes): "dust," "not-dust," and "ambiguous" (i.e., classifier is unable to determine whether what is in the image is dust). It should be understood that dust can appear in just a portion of an image (e.g., as a cloud of dust stirred up by some activity or force), and presence or absence of dust can be determined separately for different regions of an image. For instance, where image segmentation (as described above) is employed, a dust classifier can operate on each segment of an image to determine whether the segment contains dust or something other than dust (i.e., "not-dust"). In some embodiments, training of one or more dust classifiers can occur on an ongoing basis as the sensors collect additional data. Any number and combination of dust classifiers can be made available in dust classifier library 512.

Dust classifier selector 510, which can be implemented in any combination of processing hardware and/or software, can select an appropriate dust classifier from library 512 based on input dust-characterizing data. In some embodiments, the dust-characterizing data can include user input. For example, the user can specify that the autonomous vehicle is in a gold mine (or in a gold mine in Australia). Dust-characterizing data can also include information about the current state of the autonomous vehicle, such as whether it is moving forward, moving in reverse, actively digging, loaded with cargo or unloaded, or the like. Such information can be obtained, e.g., by feedback from vehicle systems 112 and/or controls subsystem 208 of FIG. 2A. Using the dust-characterizing data, dust classifier selector 510 can select a dust classifier from library 512. In some embodiments, dust classifier selector 510 selects the dust classifier whose category best matches the dust-characterizing data. For instance, if the categories include types of mines and the autonomous vehicle is in a gold mine, "gold mine" may be the best match. If the categories further include geographic data and the gold mine is in western Australia, then "gold mine in Australia" or "gold mine in western Australia" (depending on the granularity of categories) may be the best match. As another example, if the categories further include categories incorporating activity of the autonomous vehicle and the vehicle is currently moving forward, then "gold mine—moving forward" may be the best match.

Operation of dust filter 504 can be independent of operation of object classifier 502, although both may operate at the same time on the same sensor data or overlapping but not identical sensor data. The particular operation of object classifier 502 is not relevant to understanding the present disclosure; it suffices to understand that the output of object classifier 502 can be an identification of an object (e.g., background only (no object), stationary object, moving object, type of object, direction of movement, etc.) and a confidence level associated with the identification. Dust filter 504 can apply the selected dust classifier to the sensor data to produce a dust filter output (e.g., dust, not-dust, uncertain). For example, if image segmentation (as described above) is employed, object classifier 502 and dust filter 504 can operate on sensor data corresponding to particular image segments.

Consistency check logic 506 can receive the object identification output from object classifier 502 and the dust filter output from dust filter 504. Based on these two inputs, consistency check logic 506 can determine whether the object identification output from object classifier 502 is reliable or whether only dust is present and can output a result, which can be either the object identification output from object classifier 502 or an indication of dust. In some embodiments, consistency check logic 506 can implement decision rules based on the combination of inputs. An example is described below.

Figure 6:
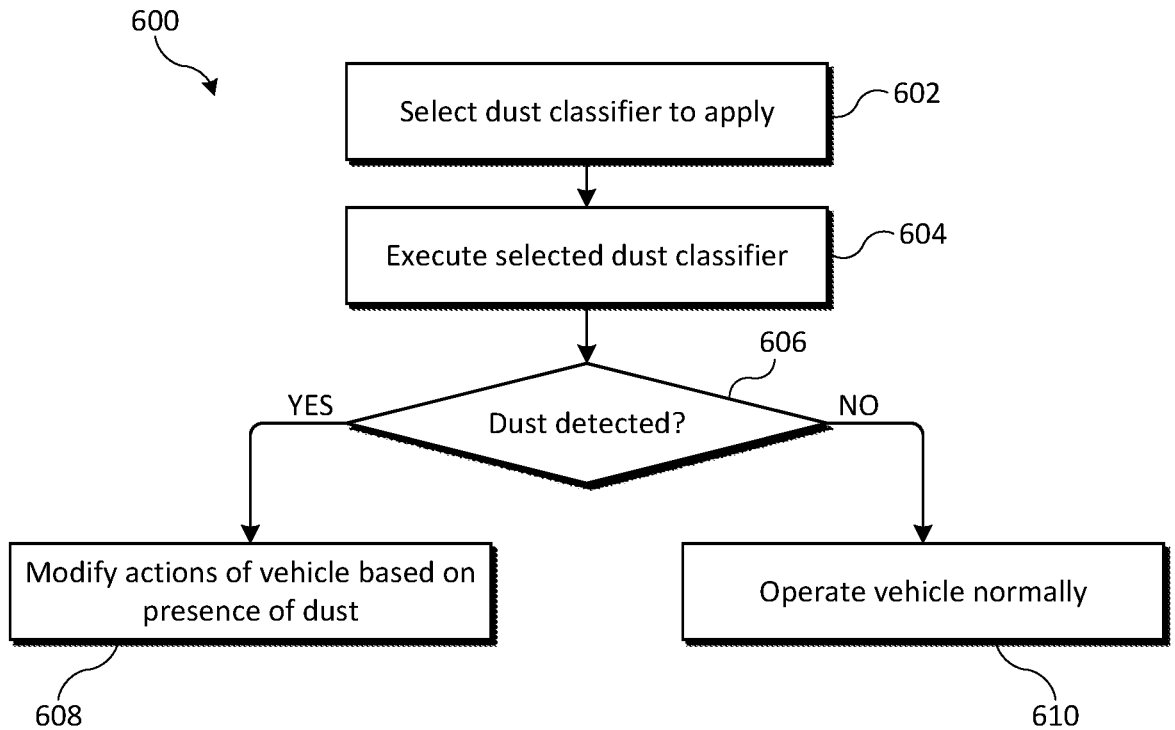
FIG. 6 is a flow diagram of a process for dust filtering according to some embodiments.

In some embodiments, dust filtering can be used to modify operations of an autonomous vehicle. FIG. 6 is a flow diagram of a process 600 for dust filtering according to some embodiments. Process 600 can be implemented, e.g., in object detection module 420 or in other modules of perception subsystem 400 of FIG. 4.

At block 602, process 600 can select a dust classifier to apply, e.g., using dust classifier selector 510 of FIG. 5. For example, as described above, a library of trained dust classifiers optimized for different categories of dusty environments may be available. Selection of a dust classifier can be automatic, based on inputs such as the category of environment in which the autonomous vehicle is operating, the current activity of the autonomous vehicle, and so on. The dust classifier that best matches the inputs can be selected.

At block 604, process 600 can execute the selected dust classifier. For example, sensor data can be input into the dust classifier, which generates an output indicating dust, not-dust, or uncertain. If, at block 606, the dust classifier output indicates dust, then at block 608, operations of the vehicle can be modified based on the presence of dust. If, at block 606, the dust classifier output indicates not-dust, then at block 610, the vehicle can operate normally.

A number of different modifications to vehicle behavior can be supported. For example, in the presence of dust, an autonomous vehicle may slow down, use different sensors (or different amounts of sensor data), change the operating mode of sensors (e.g., LIDAR wavelengths), change auxiliary behaviors (e.g., turning external lights on or off), and so on.

Figures 7, 8:
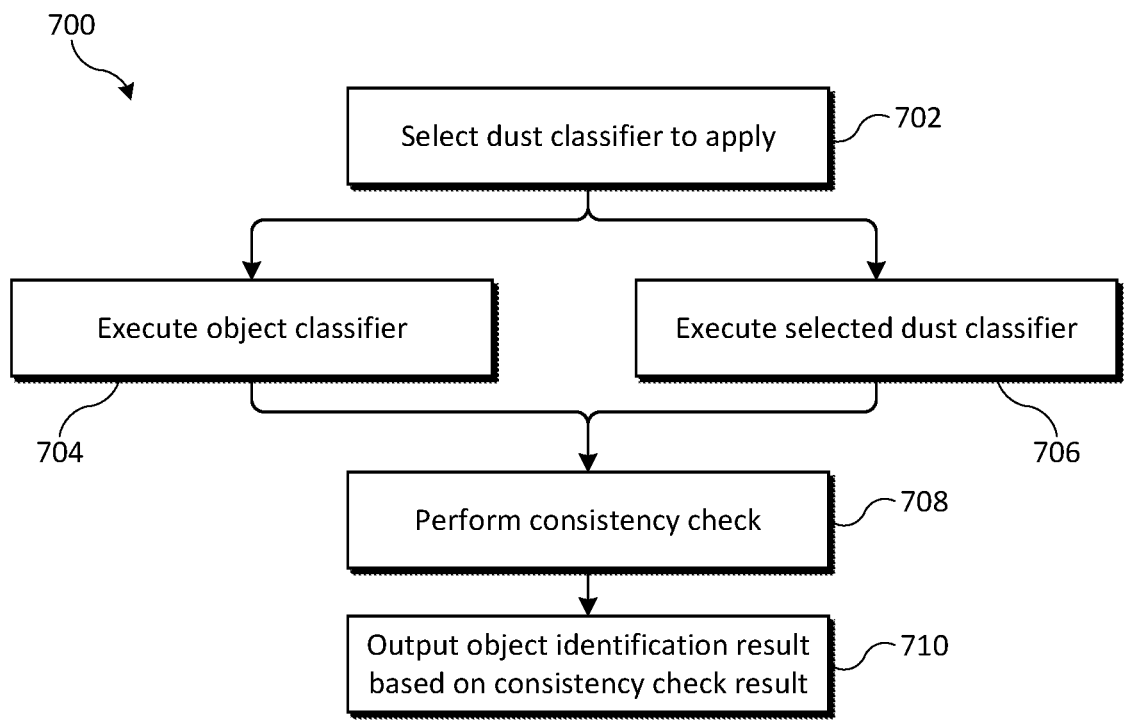
FIG. 7 is a flow diagram of a process for object detection in a dusty environment according to some embodiments.
FIG. 8 is an example of a lookup table providing decision rules for consistency checking logic that can be implemented according to some embodiments.

In some embodiments, detection of dust can be used in interpreting the output of other modules, such as an object classifier module. By way of example, FIG. 7 is a flow diagram of a process 700 for object detection in a dusty environment according to some embodiments. Process 700 can be implemented, e.g., in object detection module 420 or in other modules of perception subsystem 400 of FIG. 4.

At block 702, process 700 can select a dust classifier to be applied. This block can be similar or identical to block 602 of process 600 described above.

At block 704, process 700 can execute an object classifier (e.g., object classifier 502 of FIG. 5) on sensor data. Execution of the object classifier can produce an object identification and confidence level as outputs. At block 706, process 700 can execute the selected dust classifier on the sensor data (e.g., using dust filter 504 of FIG. 5). Execution of the dust filter can produce a dust filter output as described above. The object classifier and the dust classifier can operate on the same sensor data, and the two classifiers can operate concurrently or serially as desired.

At block 708, a consistency check is performed, e.g., using consistency check logic 506 of FIG. 5, and at block 710, a resulting object identification is output, based on the consistency check result. The resulting object identification can be used in further processing operations of the AVMS, including internal map generation and/or action planning. These operations can be unaffected by the presence of dust filter 504, except that the object identification may be altered as a result of the consistency check at block 708. Examples of consistency checking will now be described.

In some embodiments, consistency check logic 506 can implement rules-based decision logic based on a combination of outputs of object classifier 502 and dust filter 504. FIG. 8 is an example of a lookup table 800 providing decision rules that can be implemented according to some embodiments. In this example, dust filter 504 produces an output that is either dust, not-dust, or unknown. Object classifier 502 provides an output that can indicate any of the following: no object detected (e.g., the region in question includes only "background" such as terrain, sky, etc.); stationary object detected; moving object detected. Object classifier 502 may also provide additional outputs such as type of object, information about object movement (if a moving object is detected), and a confidence score or other indicator of reliability of the identification of the object (or absence of object). It should be understood that outputs of dust filter 504 and object classifier 502 can be provided for each segment of a segmented image, and consistency check logic 506 can perform a consistency check for each segment.

In table 800, six cases are distinguished. In the first case, the object classifier output indicates that only background is detected and the dust filter output indicates dust. These outputs are considered consistent, and consistency check logic 506 outputs a result that only dust, not an object, is present.

In the second case, the object classifier output indicates a stationary object identified with low confidence (e.g., confidence score below a threshold) and the dust filter output indicates dust. In this case, it is assumed that the object classifier erroneously identified the dust as an object, which would explain the low-confidence result of the object classifier. In this case, consistency check logic 506 outputs a result that only dust, not an object, is present.

The third cases covers all other instances where the dust filter output indicates dust. The object classifier output may indicate a moving object, or a stationary object with high confidence (e.g., confidence score above the threshold). In these instances, the inconsistency is resolved in favor of the object detector, and the result of consistency check logic 506 is the object classifier result. It should be noted that the possibility of the object classifier erroneously identifying dust as a (solid) object is not precluded; however, the assumption that the object classifier is correct is a safer assumption.

In the fourth case, where the dust filter output indicates not-dust, the output of the object classifier is treated as reliable and used as the result.

In the fifth case, the dust filter output is ambiguous, indicating that dust might or might not be present. If the object classifier output indicates a stationary object and has low confidence, this may indicate that the sensor data is not reliable, and the result can be an indication that a fail-safe vehicle action should be taken. The autonomous vehicle can stop its activity and change to a fail-safe mode.

In the sixth case, the dust filter output is ambiguous, but the object classifier output is reliable (including stationary object with high confidence, moving object, or no object). Accordingly, consistency check logic 506 can select the object classifier output as the result.

The decision rules of table 800 can result in less unnecessary stopping of the autonomous vehicle relative to a scenario with no dust filter applied. For example, in cases where dust is detected, a low-confidence identification of a stationary object can be understood as being in fact a dust cloud rather than an actual object. The decision rules of table 800 allow the autonomous vehicle to proceed without human intervention in these circumstances, instead of stopping due to low confidence in object identification.

The decision rules shown in FIG. 8 are illustrative, and variations and modifications are possible. It should be understood that operation of the autonomous vehicle can be modified (e.g., as described above with reference to FIG. 6) in any instance where the dust filter output indicates dust, regardless of whether the consistency check logic overrides or uses the object classifier output. For instance the autonomous vehicle may slow down, activate safety lighting or audible safety alerts (e.g., beepers), modify sensor behavior, or take other measures associated with operating in airborne dust.

It should be understood that any of the embodiments of the present invention can be implemented in the form of control logic using hardware (e.g., an application specific integrated circuit or field programmable gate array) and/or using computer software with a generally programmable processor in a modular or integrated manner. As used herein a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable storage medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable storage medium may be any combination of such storage devices. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. Such programs may also be encoded and transmitted using carrier signals adapted for transmission via wired, optical, and/or wireless networks conforming to a variety of protocols, including the Internet; however, the term "computer-readable storage medium" excludes transitory signals. A computer system may include a monitor, printer or other suitable display for providing any of the results mentioned herein to a user.

Any of the methods described herein may be totally or partially performed with a computer system including one or more processors, which can be configured to perform the steps. Thus, embodiments can involve computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, and of the steps of any of the methods can be performed with modules, circuits, or other means for performing these steps.

The specific details of particular embodiments may be combined in any suitable manner without departing from the spirit and scope of embodiments of the invention. However, other embodiments of the invention may be involve specific embodiments relating to each individual aspect, or specific combinations of these individual aspects.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications and description mentioned herein are incorporated by reference in their entirety for all purposes. None is admitted to be prior art.

The above description is illustrative and is not restrictive. Many variations of the invention will become apparent to those skilled in the art upon review of the disclosure. The scope of patent protection should, therefore, be determined not with reference to the above description, but instead should be determined with reference to the following claims along with their full scope or equivalents.

What is claimed is:

1. A computer-implemented method for an autonomous machine, the method comprising:
   receiving sensor data from one or more environmental sensors;
   determining a current environmental category for the autonomous machine;
   selecting a dust classifier from a library of dust classifiers based on the current environmental category, wherein the library of dust classifiers includes a plurality of dust classifiers, wherein each dust classifier is a machine-learning model that has been trained to distinguish between dust and not-dust, wherein each dust classifier is trained using sensor data collected in a different one of a plurality of environmental categories;
   applying the selected dust classifier to the sensor data to determine whether dust is detected;
   applying an object classifier to the sensor data to identify an object in an environment of the autonomous machine;
   performing a consistency check on an output of the selected dust classifier and an output of the object classifier; and
   making a final object identification based on a result of the consistency check and the output of the object classifier.

2. The method of claim 1 wherein the dust classifier is a state vector machine (SVM) classifier.

3. The method of claim 1 wherein the output of the selected dust classifier has states indicating dust, not-dust or ambiguous.

4. The method of claim 3 wherein making the final object identification based on the result of the consistency check includes:
   identifying that only dust is present in the event that the output of the selected dust classifier is the dust state and the output of the object classifier is in a low-certainty state.

5. The method of claim 4 wherein making the final object identification based on the result of the consistency check further includes:
   using the output of the object classifier as the final object identification in all other cases.

6. The method of claim 1 wherein the plurality of environmental categories includes a first category corresponding to a construction site and a second category corresponding to a mining site.

7. The method of claim 1 wherein the plurality of environmental categories includes two or more categories corresponding to different types of mining sites distinguished based on materials being mined.

8. The method of claim 1 wherein the plurality of environmental categories includes two or more categories corresponding to different geographical areas.

9. The method of claim 1 wherein the plurality of environmental categories includes a first category corresponding to motion of the autonomous machine in a forward direction and a second category corresponding to motion of the autonomous machine in a reverse direction.

10. A system for object identification for an autonomous vehicle, the system comprising:
    a storage subsystem to store a plurality of dust classifiers, each dust classifier trained to distinguish between dust and not-dust, wherein each dust classifier is a machine learning model that has been trained using sensor data collected in a different one of a plurality of environmental categories;
    a set of sensors to collect sensor data from an environment around an autonomous vehicle; and
    a processor coupled to the set of sensors and the storage subsystem, the processor configured to:
    receive sensor data from the set of sensors;

determine a current environmental category for the autonomous vehicle;

select a dust classifier from the plurality of dust classifiers based on the current environmental category;

apply the selected dust classifier to the sensor data to determine whether a dusty condition is present;

apply an object classifier to the sensor data to identify an object in an environment of the autonomous vehicle;

perform a consistency check on an output of the selected dust classifier and an output of the object classifier; and make a final object identification based on a result of the consistency check and the output of the object classifier.

11. The system of claim 10 wherein the sensor data includes camera data and LIDAR data.

12. The system of claim 10 wherein the processor is further configured such that determining the current environmental category includes reading user input indicating a setting in which the autonomous vehicle is operating.

13. The system of claim 10 wherein the processor is further configured such that determining the current environmental category includes determining whether the autonomous vehicle is moving forward or moving in reverse.

14. The system of claim 10 wherein the dust classifier has output states indicating dust, not-dust or uncertain.

15. The system of claim 14 wherein the processor is further configured such that making the final object identification based on the result of the consistency check includes:

identifying that only dust is present in the event that the dust classifier output state is the dust state and the object classifier output is in a low-certainty state.

16. The system of claim 15 wherein the processor is further configured such that making the final object identification based on the result of the consistency check further includes:

using the object classifier output in all other cases.

17. A computer-readable storage medium having stored therein program instructions that, when executed by a processor, cause the processor to perform a method comprising:

receiving sensor data from one or more environmental sensors of an autonomous vehicle;

determining a current environmental category for the autonomous vehicle;

selecting a dust classifier from a library of dust classifiers based on the current environmental category, wherein the library of dust classifiers includes a plurality of dust classifiers, wherein each dust classifier is a machine-learning model that has been trained to distinguish between dust and not-dust, wherein each dust classifier is trained using sensor data collected in a different one of a plurality of environmental categories;

applying the selected one of the plurality of dust classifiers to the sensor data to determine whether dust is present; and controlling an action of the autonomous vehicle based at least in part on whether dust is present.

18. The computer-readable storage medium of claim 17 wherein the plurality of environmental categories includes a first category corresponding to a construction site and a second category corresponding to a mining site.

19. The computer-readable storage medium of claim 17 wherein the plurality of environmental categories includes two or more categories corresponding to two or more different types of mining sites distinguished based on substance being mined.

20. The computer-readable storage medium of claim 17 wherein the plurality of environmental categories includes two or more categories corresponding to different geographical areas.

21. The computer-readable storage medium of claim 17 wherein the plurality of environmental categories includes a first category corresponding to motion of the autonomous vehicle in a forward direction and a second category corresponding to motion of the autonomous vehicle in a reverse direction.

22. The computer-readable storage medium of claim 17 wherein controlling an action of the autonomous vehicle includes:

performing a consistency check between an output of the selected dust classifier and an output of an object classifier; and modifying the output of the object classifier based on the output of the selected dust classifier, wherein the modified output of the object classifier is used to determine a motion of the autonomous vehicle.

* * * * *